United States Patent [19]

Siedband

[11] Patent Number: 4,540,930

[45] Date of Patent: Sep. 10, 1985

[54] PLYWHEEL-POWERED MOBILE X-RAY APPARATUS

[75] Inventor: Melvin P. Siedband, Madison, Wis.

[73] Assignee: Wisconsin Alumni Research Foundation, Madison, Wis.

[21] Appl. No.: 530,875

[22] Filed: Sep. 12, 1983

[51] Int. Cl.[3] .......................... H05G 1/24; H02K 7/02; H02K 39/00; H02P 9/12

[52] U.S. Cl. .......................................... 322/4; 310/113; 310/74; 322/10; 378/102; 378/103

[58] Field of Search ................... 322/4, 8, 10; 74/572; 310/74; 378/102, 103; 316/112, 113

[56] References Cited

U.S. PATENT DOCUMENTS

| | | | |
|---|---|---|---|
| 4,001,666 | 1/1977 | Grenfell | 322/4 |
| 4,182,967 | 1/1980 | Jordan | 310/74 |
| 4,200,974 | 4/1980 | Bax | 250/402 |
| 4,322,623 | 3/1982 | Grady | 250/402 |
| 4,355,276 | 10/1982 | Vittay | 322/8 X |
| 4,459,536 | 7/1984 | Wirtz | 322/10 |

*Primary Examiner*—R. J. Hickey
*Attorney, Agent, or Firm*—Isaksen, Lathrop, Esch, Hart & Clark

[57] ABSTRACT

A mobile X-ray apparatus (20) is disclosed which incorporates a power supply (22) in which the energy for operation of the X-ray tube (21) is supplied from a flywheel (50) coupled to an electrical machine (24) which functions as both a motor and generator. In the motor mode of operation, a controller (21) provides power to the machine (24) to operate it as a motor and drive the flywheel up to a desired operating speed. Upon request of the operator to initiate an exposure, the controller power is disconnected from the machine and the power terminals (32) of the machine (24) are connected to a transformer and rectifier (27) which increases the generated voltage and rectifies it to provide the high voltage across the X-ray tube (21) required for proper exposures. The controller (31) provides a first selected level of current to the control winding (77) of the machine (24) required during the motor mode for proper motor operation, and provides a higher selected current level to the control winding (77) during generator operation. The controller also provides a boost in the control winding current as the machine (24) begins to supply power during an exposure to compensate for the voltage sag that ordinarily occurs upon loading of the machine to thereby maintain the output voltage substantilly constant.

46 Claims, 12 Drawing Figures

PLYWHEEL-POWERED MOBILE X-RAY APPARATUS

This invention was made with U.S. Government support under Army Contract DAMD17-82-C-2050. The Government has certain rights in this invention.

TECHNICAL FIELD

This invention pertains generally to the field of X-ray systems, particularly mobile X-ray equipment, and to the power supplies for such equipment.

BACKGROUND ART

The quality of radiographic images obtainable at a given X-ray intensity level is limited by noise and the spatial resolution characteristics of the X-ray detector. For example, where an intensifying screen and film combination is used as the detector, an increase in sensitivity of the film with a proportional decrease of the X-ray exposure will result in a grainy image because of quantum mottle, while an increase in the sensitivity of the screen by increasing its thickness will result in a decrease in spatial resolution. If the X-ray target object heavily attenuates the X-ray flux, the image quality can potentially be improved either by increasing the flux intensity or lengthening the period of exposure. Larger clinical X-ray machines thus are capable of providing a variety of exposure levels to adjust to the attenuation of the portion of the body being X-rayed. This increased X-ray flux intensity is obtained by an increase in the X-ray tube current and a corresponding increase in the power drawn from the power supply.

While fixed clinical X-ray machines are provided with power from high capacity electrical power lines that are capable of delivering large surges of current, a portable X-ray unit cannot make such heavy power demands since it must be capable of operating from a normal 115 volt AC outlet or, in the field, from a storage battery or portable generator. Thus, to improve image quality in portable machines, radiographs may be taken over a longer exposure time to yield the same total X-ray exposure that a clinical X-ray machine could provide at higher intensity levels. With typical portable machines, an exposure time of 0.25 seconds or more may be required to complete an adequate exposure of a normal chest, and several seconds may be required to form a satisfactory image of a heavy abdomen. These long exposure times often result in a blurred image because of the normal motions of the body from breathing, heart beats, and voluntary muscle action. In addition, a small portable machine relying on a limited power supply may have to be operated at high values of kVp to provide adequate penetration of the X-ray target, resulting in a sacrifice of contrast.

Presently available mobile X-ray systems are of four types. One common small, lower power unit operates directly from 115 VAC, 60 Hz line power and is usually limited to about 20 mA maximum tube current. A second type of system utilizes 60 Hz, single phase line power, but at 220 VAC, allowing power lines surges up to 100 amperes and tube currents of about 200 to 250 mA maximum. A third type of portable unit utilizes capacitors to store energy for discharges in a manner similar to a capacitor discharge photoflash gun. These capacitive storage units typically are limited to 17 mAs equivalent tube charge at 100 kVp. A fourth type of portable unit utilizes batteries to provide the surge of power during exposures and may be capable of instantaneous power of about 10 kilowatts and an input tube current of about 100 mA. Because of the weight of the batteries, the battery powered X-ray units tend to be quite heavy, typically ranging in weight between 200 and 400 kilograms.

The presently available mobile X-ray machines provide marginal performance where stop-motion exposures are desired or high power levels are needed for penetration. If good stop-motion images are required, current input requirements rise to levels beyond the capability of normal hospital wiring or of ordinary batteries. For example, operation of a battery powered mobile X-ray machine at 400 mA, 100 kVp would require current from a 90 volt battery in excess of 500 amperes, far beyond the capability of present compact batteries (which typically weigh several hundred pounds). Thus, present mobile X-ray generators generally cannot operate at power levels corresponding to tube currents above about 200 mA for line-powered machines or 100 mA for battery powered machines.

Energy storage flywheels have been proposed as an alternative power source for mobile X-ray units although such machines are not presently commercially available. Examples of such machines are shown in the U.S. Pat. Nos. to Grady, 4,322,623, and Jordan, 4,182,967. The apparent limitations of such proposed flywheel power supplies include the relatively heavy weight of large flywheel, motor, and generator combinations and inadequate adjustability and regulation of the power provided to the X-ray tube.

SUMMARY OF THE INVENTION

The flywheel powered mobile X-ray apparatus of the present invention is relatively light in weight and portable compared to present high quality mobile X-ray units and is capable of operating at higher pulsed power levels than present portable machines. The pulsed power supplied to the X-ray tube is closely controlled in both magnitude and duration and is adjustable by the operator to suit the type of exposure required. The energy storage flywheel can be "charged" from commonly available power sources such as 115 volt single phase power lines or 24 volt truck battery/generator electrical systems.

The energy storage flywheel is designed to operate at relatively high rotational velocity and is coupled by a shaft directly to an electrical machine that is capable of acting either as a motor or generator. In the motor mode, power is supplied to the machine to drive the flywheel up to speed. When the flywheel is at operating speed, an exposure can be made by switching the electrical machine to the generator mode and supplying the output power from the electrical machine to a high voltage transformer; the transformer increases the voltage to an AC operating level which is rectified to yield a power pulse supplied to the X-ray tube. Relatively high output frequencies are obtained from the generator (e.g., 300 to 400 Hz) to minimize the ripple on the voltage supplied to the X-ray tube and to reduce required size of the transformer. The magnitude of the voltage supplied to the X-ray tube is generally a function of the current magnitude in the machine control winding, allowing selection of kVp level by adjustment of the control current. To compensate for the sag in the output voltage occuring upon connection of the transformer to the power terminals of the machine, the control winding current is preferably increased just prior to or upon connection to compensate for loading and thereby cause the output voltage to remain substantially constant.

It is preferred that the electrical machine provide a polyphase output rather than single phase to reduce the required size of the generator high voltage transformer and to increase the ripple frequency of the rectified pulse.

By utilizing the electrical machine as both motor and generator, substantial savings in weight are obtained by elimination of the second machine and the power transmission mechanisms required to couple a motor and generator to the same shaft. The utilization of a single shaft in the present invention further reduces vibration as well as frictional losses. The polyphase electrical machine can be driven as a motor by providing drive voltages to the phase windings from driver circuits which are coordinated to cause the magnetic field within the phase windings to rotate with the rotor, for example, by detecting shaft position using optical detectors on the flywheel which trigger the motor driver to supply power to the phase windings in synchrony with the position of the rotor.

The apparatus also automatically times the proper exposure pulse duration selected by the operator and ensures that the X-ray tube rotor and heater filament are in proper condition before initiating exposure.

Further objects, features and advantages of the invention will be apparent from the following detailed description taken in conjunction with the accompanying drawings showing a preferred embodiment of a flywheel powered mobile X-ray apparatus in accordance with the invention.

BEST MODE FOR CARRYING OUT THE INVENTION

Figure 1:
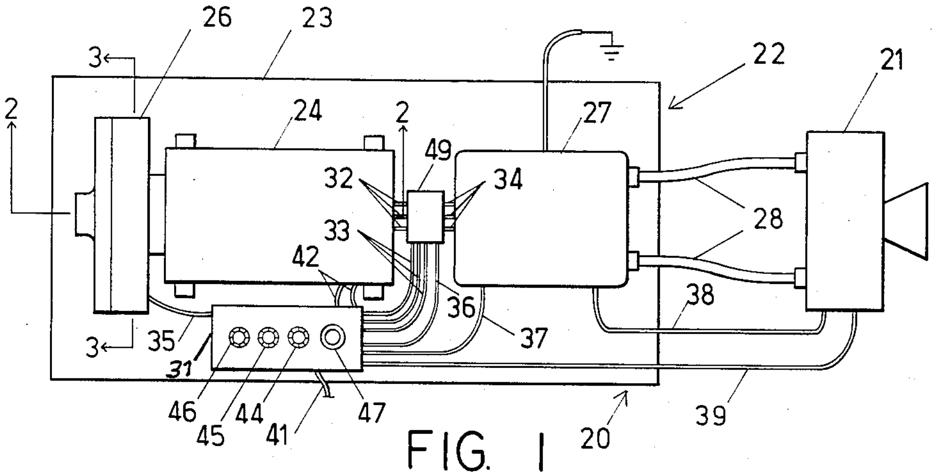
FIG. 1 is a top plan view of a flywheel powered mobile X-ray apparatus in accordance with the invention.

With reference to the drawings, a flywheel powered mobile X-ray apparatus in accordance with the invention is shown generally at 20 in FIG. 1. The apparatus 20 includes an X-ray tube 21 and a power supply system therefor generally shown at 22 and mounted upon a base 23. The power supply 22 includes a rotating electrical machine 24 which is capable of acting as both a motor and generator, a flywheel assembly 26, and a high tension transformer and rectifier unit 27 which receives the electrical output from the machine 24 and provides a high voltage pulse upon command through high voltage cables 28 to the X-ray generator 21.

The power supply 22 is controlled to provide a pulse on the cables 28 to the X-ray generator of a desired magnitude and duration by a controller 31 which controls the machine 24 to operate as either a motor or generator. The power terminals 32 of the machine 24 are appropriately switched by the controller to either receive electrical power from the controller through lines 33 during operation of the machine 24 in the motor mode, or to supply power on lines 34 to the transformer 27 when the machine 24 is operated as a generator. As explained further below, the controller receives signals indicative of the position of the rotor shaft which is transmitted as a signal on a line 35 from sensors (not shown in FIG. 1) mounted within the flywheel assembly 26. As discussed further below, the controller 31 also provides line voltage electrical power on a line 37 to the transformer unit 27 which includes an isolation transformer (not shown in FIG. 1); the power from the secondary of the isolation transformer is transmitted on a line 38 to the cathode filament of the X-ray tube. Power is also provided from the controller 31 through a connecting line 39 to the anode rotor motor within the X-ray tube when X-ray exposures are to be made.

The apparatus 20 is intended for mobile operation and to that end the components on the base 23 may be conveniently set on a cart or other mobile carrier (not shown). The apparatus is adapted to utilize a prime power source which need be capable of providing only relatively low power levels over an extended period of time rather than one capable of supplying the surges of power required to directly operate the X-ray generator. For example, the power source may be common 115 VAC outlets in a hospital which can be connected to supply electrical power to the control unit 31 through a cord 41. Under such circumstances, the control unit 31 will include a DC power supply unit of any standard design to convert the AC line power to the various DC power levels required by the system. For highly mobile field and emergency use, the low level power source may be a portable electrical generator, a truck generator, or even storage batteries. Again, appropriate power supply components of standard design would be included in the control unit 31 to provide the various desired DC power levels.

During charge-up operation of the apparatus 20, electrical power from the line 41 is transferred by the controller 31 through the power lines 33 and 32 to the power terminals of the machine 24. Electrical control power is also supplied by the controller 31 on lines 42 to the control terminals of the machine 24. The electrical power supplied by the controller to the power and control terminals of the machine 24 causes the machine 24 to operate as an electrical motor, driving the flywheel (not shown in FIG. 1) of the flywheel assembly 26 to higher rotational velocity. The flywheel eventually comes up to the desired maximum speed and sufficient power is thereafter supplied to the machine 24 to maintain this speed until an X-ray exposure is to be made. When the operator desires to make an exposure, he sets the controller 31 to provide the desired kVp level, filament current level (and thereby tube current), and duration of the exposure. For purposes of illustration, the filament current level can be adjusted by a dial 44, the kVp level by adjustment of a dial 45, and the exposure time by adjustment of a dial 46 on the controller 31. The operator then presses an exposure button switch 47 which initiates a sequence of events resulting in the exposure. As a consequence of the operator pressing the exposure button 47, the controller 31 discontinues the supply of electrical power to the machine 24 and provides control power on the electrical lines 42 to the control terminals of the machine 24 to cause the machine to behave as an electrical generator. After a delay to allow the anode rotor to come up to speed and the filament current to heat the cathode, a switching unit 49 is controlled to connect the power terminals 32 to the output lines 34 leading to the transformer and rectifier unit 27 to provide the desired voltage on the power cables 28 for a selected exposure time. After the exposure has been completed, the release by the operator of the exposure button 47 causes the apparatus to revert back to the motor mode in which electrical power is supplied to the machine 24 to drive the flywheel back up to its maximum operating speed.

Figure 2:
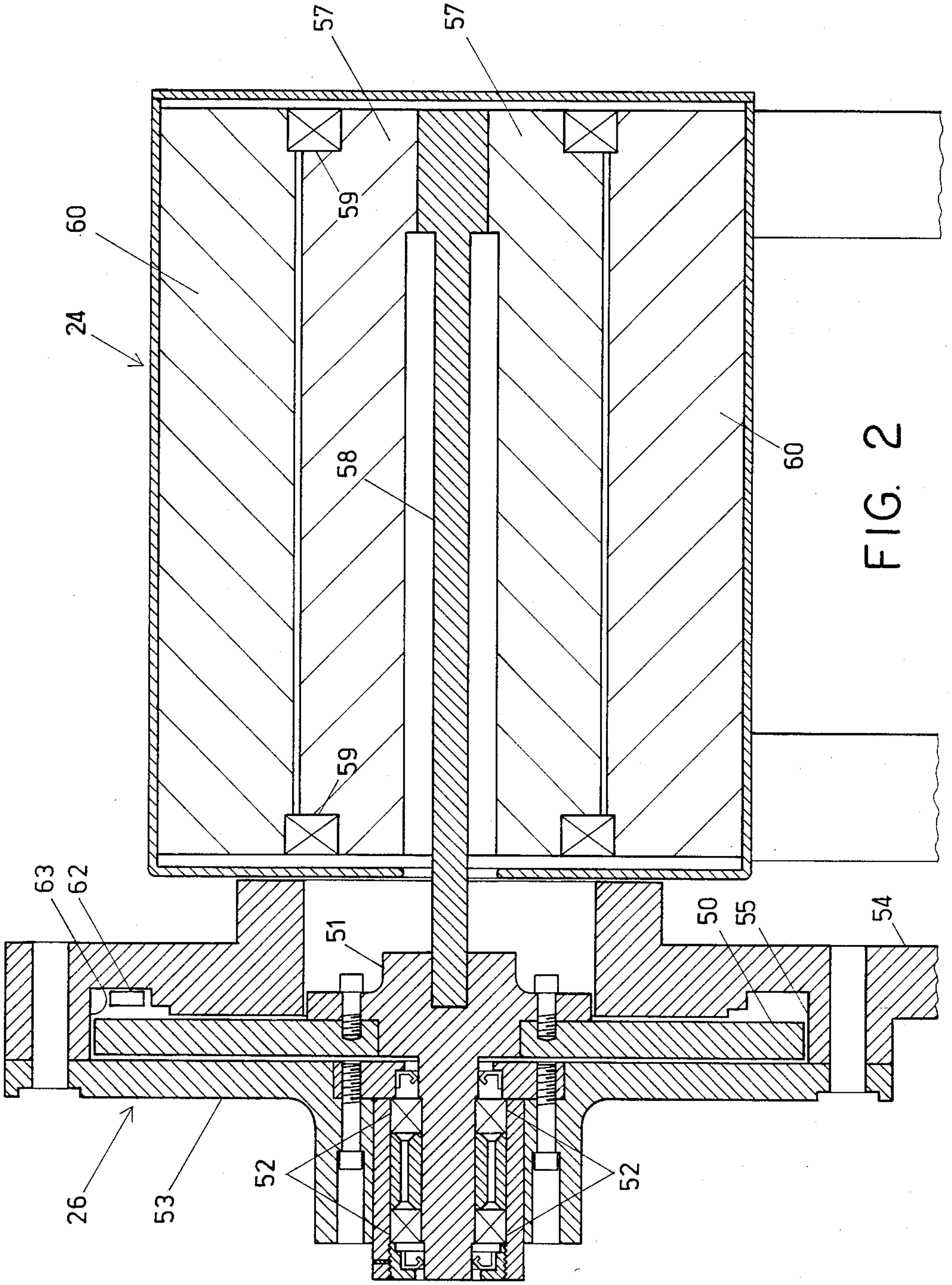
FIG. 2 is a cross-sectional view of the flywheel and electrical motor/generator connected thereto taken generally along the lines 2—2 of FIG. 1.

With reference to the cross-sectional view of the flywheel assembly 26 and the electrical machine 24 in FIG. 2, the flywheel 50, preferably formed of a flat plate of high strength material (e.g., 4340 alloy steel, normalized and tempered), is mounted for rotation on a hub 51 having a cantilevered shank supported for rotation by bearings 52 mounted in an end plate flywheel housing portion 53. The end plate 53 is firmly bolted to a main housing base plate 54. The base plate has a cylindrical channel formed therein and a cylindrical peripheral inner wall 55 closely spaced from the outer peripheral edge of the flywheel 50. The base plate 54 and the end plate 53 together shield the flywheel and provide a containment structure for the flywheel in case of rupture at operating speed. To minimize the transmission of vibration from the flywheel to the machine 24, it is preferred that the coupling between the flywheel and the rotor 57 be as shown in FIG. 2, in which a cantilevered rod 58 extends from its attachment to the rotor 57 substantially the length of the machine 24 to splined engagement at its other end with the hub 51. Bearings 59 at the outer periphery of the rotor 57 mount the rotor for rotation with respect to the stator portion 60 of the machine. For the reasons described below, the machine 24 preferably is built as a polyphase (e.g., three phase) alternator having a rotor field winding supplied with current in an appropriate fashion, such as through slip rings or a magnetic coupling (not shown), and a polyphase armature winding forming the stator.

Figure 3:
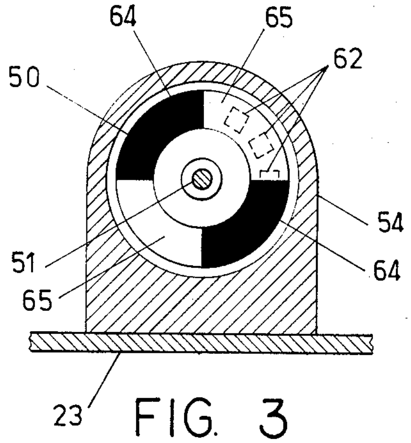
FIG. 3 is a cross-sectional view through the flywheel housing taken generally along the lines 3—3 of FIG. 1 showing the reflective sectors formed on the flywheel.

To sense the position of the rotor with respect to the stator, three optical reflection sensors 62 (one shown in FIG. 2) are mounted to the base plate 54 of the flywheel housing in an indented ring opening 63 in close proximity to one face of the flywheel. The light emitting and detecting sensors 62 cooperate with rotating light reflecting sectors, e.g., alternating black sectors 64 and white sectors 65 painted on the face of the flywheel, as shown in the cross-sectional view of FIG. 3. For a three phase machine having a four pole rotor, two white and two black sectors are used and the optical reflection sensors 62 are preferably spaced 30° apart. These sensors detect the passage of the four alternating black and white sectors 64 and 65 to produce electrical pulses from each detector having, e.g., a high output level when the white sector is beneath a sensor and a low output level when the dark sector is beneath the sensor. The pulses produced by each sensor will thus have a duration of 90 mechanical degrees and will be 30 mechanical degrees out of phase with the pulse produced by the adjacent sensor. The pulse frequency will be twice the frequency of revolution of the flywheel and the rotor.

Figure 4:
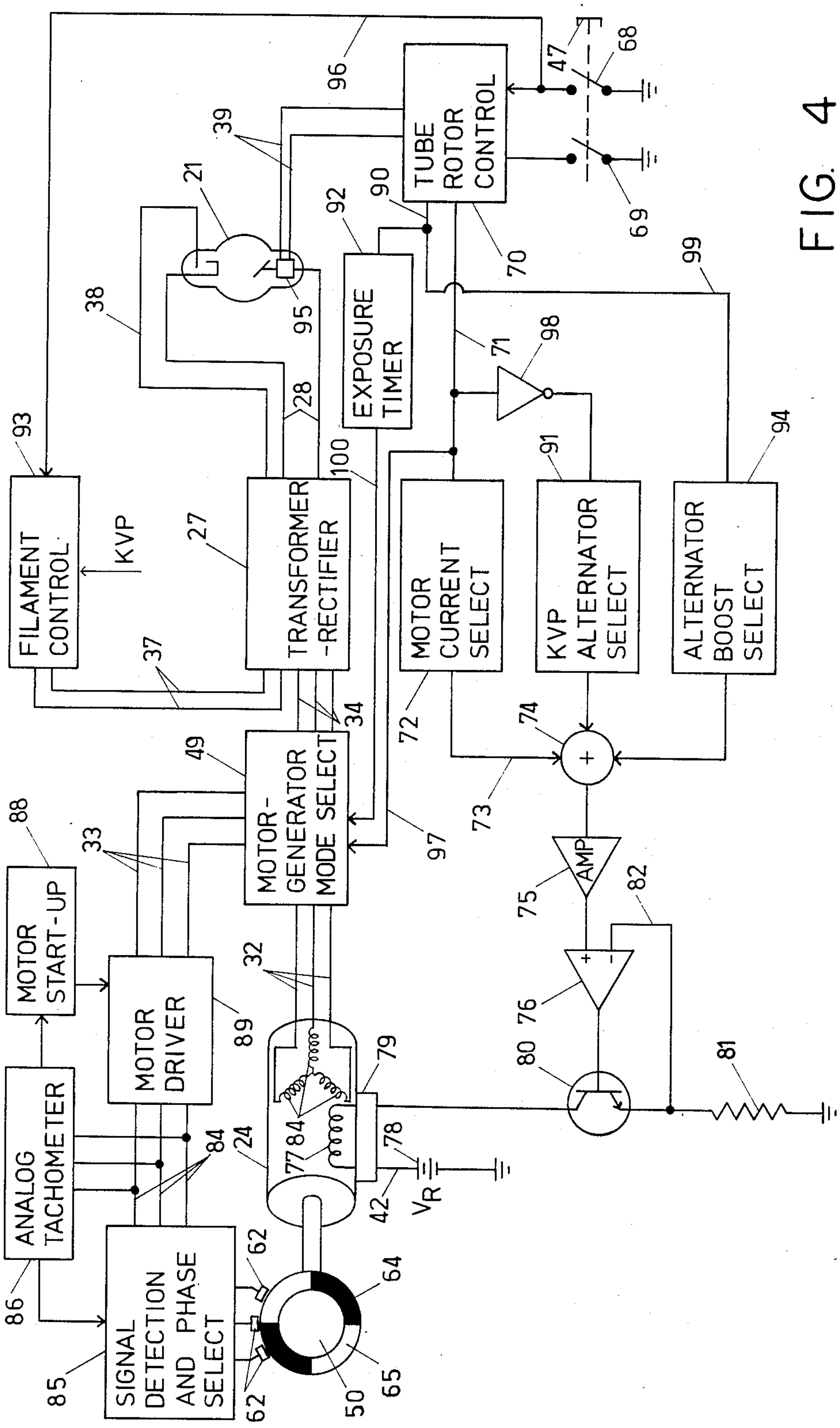
FIG. 4 is a block diagram showing the functional units of the apparatus of the invention.

A block diagram illustrating the manner in which the operation of the apparatus is controlled is shown in FIG. 4. The exposure button 47, by which the operator initiates an exposure, has, as is customary in X-ray machines, two sequentially activated normally open switches 68 and 69. When the switch 68 is open, a tube rotor control circuit 70 provides a high output signal on an output line 71 to a motor current select circuit 72 which provides an output signal on a line 73 indicative of the motor mode field current for the machine 24 as selected by the operator. This signal is passed through a summing junction 74 and a buffer amplifier 75, the output of which is supplied to the positive input of a summing amplifier 76. The control or field winding 77 of the machine 24 is connected to receive power from a source 78 through slip rings or a magnetic coupling 79, and the current passing through the control winding 77 is selected by a power transistor 80. The field current from the transistor 80 is passed to ground through a viewing resistor 81 of low resistance, and the voltage across the resistor 81 is fed back on a line 82 to the negative input of the differential amplifier 76 to thereby maintain the current through the winding 77 at the desired level for motor operation despite transients.

During the operation in the charge-up or motor mode, the stator or armature windings 84 of the machine 24 are provided with electrical power at the power terminals from the lines 32 in a manner which causes a magnetic field to rotate about the rotor at a speed synchronized to the speed of rotation of the rotor. In the motor mode, the lines 32 are connected by the motor generator mode select switch 49 to the supply lines 33 which receive the power from a motor drive system. This system operates by utilizing the signals from the optical sensors 62 which are converted to properly conditioned electrical pulse signals on lines 84 by a signal detection and phase select circuit 85. This circuit adjusts the phase angles of the pulses in the signals on the output lines 84 so that the drive signals to the machine 24 lead the signals from the position sensors 62, and the rotor shaft position, by larger angles as the speed of rotation of the machine increases. With the utilization of the three sensors 62 positioned 30 degrees mechanically from each other, the phase angle of the electrical pulses with respect to the position of the rotor shaft can be shifted by increments of 30 degrees by selecting a proper combination of the position signals and their inverses. An analog tachometer circuit 86 provides a voltage proportional to the rotational speed of the flywheel (and rotor) to the signal detection and phase select circuit 85 and to a motor start-up circuit 88. The signal from the tachometer 86 is utilized by the circuit 85 to trigger the changes in phase of the signals on the lines 84 and by the motor start-up circuit 88 to provide the proper power to the motor driver 89 required during start-up and low speed operation of the machine 24. A motor start-up power adjustment is necessary because back EMF to the motor drive circuit increases as the speed of the rotor increases. Without adjustment of the available power for the motor drive circuit, a current overload could be drawn at start-up and low speed.

As noted above, before an operator makes an X-ray exposure, the kVp level of the tube exposure is set, which determines the output of the kVp alternator select circuit 91. The operator also adjusts the exposure time, determined by the output of an exposure timer circuit 92, and sets the X-ray tube current by adjustment of a filament control circuit 93. For reasons explained further below, an alternator boost select circuit 94 is provided which can be adjusted by the operator if desired. Upon completion by the operator of the selection of the kVp level, tube current, and exposure time, exposure is initiated by the operator by pressing the button 47 to immediately close the first switch 68. In conventional X-ray systems, the two switches 68 and 69 may be separate so that the operator can close the switch 68 first to prepare the X-ray system for an exposure and thereafter press the second switch 69 when the actual exposure is to be made. Alternatively, the switches 68 and 69 can be ganged together, as shown, to operate from a single push button, commonly by having the switch 68 close first upon initial depression of the button 47 and the switch 69 close upon further depression of the button. Initial closure of the switch 68 provides a signal to the tube rotor control 70 to cause it to provide power on the lines 39 to the anode rotor motor 95 to begin rotation of the anode and to transmit the signal from the switch 68 to an output line 71. The closure of the switch 68 also provides a signal on a line 96 to the filament control circuit 93 which activates it to provide output power on lines 37 through the transformer 27 and the line 38 to the cathode filament within the X-ray tube 21. However, the tube rotor control 70 interlocks the signal from the switch 69 so that the signal from this switch is not passed to the output line 90 until the anode motor 95 has come up to full operating speed. Thus, even if the operator closes the switch 69 immediately after the switch 68 is closed, an X-ray exposure cannot be made until the tube rotor is at proper speed, thereby avoiding damage to the anode. The presence of the low signal on the line 71 deactivates the motor current select circuit 72 so that the motor current signal is no longer present on the line 73. The signal on the line 71 also is transmitted by a line 97 to the motor-generator mode select switch 49 to disconnect the motor power supply lines 33 from the power terminal lines 32, and is inverted by an inverting amplifier 98 and provided to the kVp alternator select circuit 91. The alternator select circuit 91 is activated by the signal from the amplifier 98 to provide an output signal to the summing amplifier 74 related to the desired field current to be passed through the winding 77, which will generally be higher than the field current required during the motor mode of operation.

The alternator boost circuit 94 is activated when a signal is passed from the switch 69 through the rotor control 70 to a line 99 leading to the alternator boost select circuit, which responds by providing an additional boost signal to the summing junction 74. The additional boost signal provided from the circuit 94 compensates for the sag in field current as the power terminals 32 are loaded upon initiation of an X-ray exposure. The decline in output voltage is due to three effects: a decline in rotor speed as energy is drawn from the flywheel, resistive loss within the windings, and the change in magnetic pathway within the machine as a result of current flow in the stator winding. This last effect is distinct from reactive effects which are relatively independent of time. The reaction of the machine 24 to a step increase in rotor winding current is preferably gradual, with a rise time constant roughly equal to the time constant of the decline in output voltage upon connection of the load. Under such circumstances, the application of a boost in rotor control winding current as or shortly before or after the load is connected can be used to cancel the expected sag and produce a substantially constant output voltage. The preferred time of application of the rotor current boost with respect to the time of load connection generally depends on the response time characteristics of the electrical machine 24, and can be selected by experiment with any particular machine to best compensate for the output voltage sag upon loading. It is generally to be expected that the rotor current boost will be applied shortly before connection of the load (e.g., 50 to 100 milliseconds) particularly where the exposures will be of short duration.

After receiving the signal from the tube rotor control 70 indicating that the switch 69 has been closed, the exposure timer 92 delays for a selected period of time to allow the boost current to begin to build up in the field coil 77, and thereafter provides a signal on an output line 100 for a preselected period of time to cause the motor-generator select switch 49 to connect the power terminals 32 to the transformer-rectifier 27. After the exposure is completed, the timer 92 removes the signal from the line 100 and the motor-generator select switch 49 disconnects the output lines 34 from the power terminal lines 32. Upon release of the push button 47 by the operator, and the opening of the switches 68 and 69, the motor current select circuit 72 is activated and the alternator select circuit 91 and boost select circuit 94 are deactivated, so that the current in the winding 77 returns to the desired level for motor operation. In addition, the removal of the signal on the line 97 causes the motor-generator mode select switch 49 to return to the motor mode in which the motor drive power supply lines 33 are connected to the power terminals 32.

It is thus seen that the power supplied to the X-ray tube 21 is closely controlled to yield an X-ray exposure of the desired duration, kVp level and tube current without the need to monitor the output voltage or current on the power lines 28 supplying the tube 21. Since the flywheel is driven up to a selected operating speed by the motor drive system utilizing the machine 24 as a motor, the power available during an exposure from the flywheel as converted by the machine 24 is precisely known. The energy stored in the flywheel can be released rapidly into the X-ray generator at peak power levels comparable to large X-ray machines (25 to 40 kilowatts peak), while the input power required from the prime source is low, generally less than a kilowatt. Exemplary circuits carrying out these control functions are described in further detail below.

Figure 5:
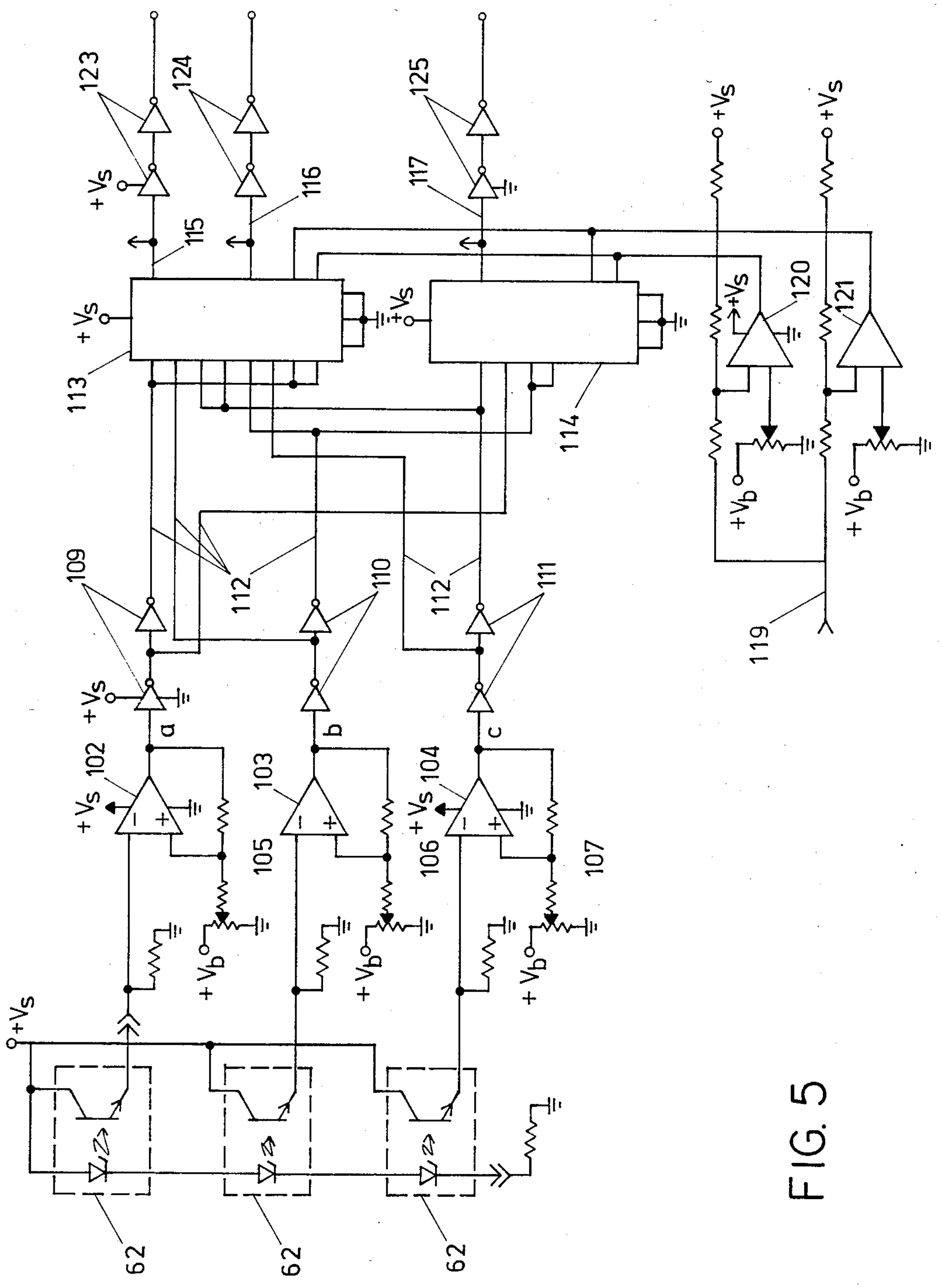
FIG. 5 is an electrical schematic diagram of the optical signal detection and phase select circuit.

The signal detection and phase select circuit of the motor controller is shown in FIG. 5 with the electrical components of the optical reflection sensors shown within the dashed lines labeled 62. The output voltages from the sensors 62 are provided to the negative inputs of three operational amplifier comparators 102, 103, and 104, respectively provided with an adjustable voltage to their positive input by resistive voltage dividers 105, 106, and 107. The switchover points of the comparators can be adjusted to allow the duty cycle of each of the output signals from the sensors 62 to be exactly equal in duration. The outputs of the comparators 102, 103 and 104 are buffered through CMOS inverter pairs 109, 110, and 111, respectively. Six output lines 112 from the inverter pairs 109, 110 and 111 provide output signals corresponding to the outputs of each of the sensors 62 and their inverses. The six signals are supplied in selected order to CMOS analog data selectors 113 and 114. If the output of the comparator 102 is considered signal A, the output of comparator 103, signal B, and of comparator 104, signal C, the output from the analog selector 113 on the first line 115 can be either A, B, or C; the line 116 from the comparator 113 can be either B, C, or A; and the line 117 from the comparator 114 can be either C, A, or B. The second group of signals on the lines 115, 116, and 117 is 30 mechanical degrees ahead of the first group while the third group is 60 mechanical degrees ahead of the first group. The switching of the analog data selectors 113 and 114 is accomplished by providing a signal proportional to speed from the analog tachometer 86 on a line 119 which is provided to comparators 120 and 121. The comparator 120 is set to switch at a first voltage level on the line 119 to cause the second set of signals to be passed through the analog data selectors on to the output lines 115, 116 and 117, whereas the comparator 121 is set to switch at a still higher level of voltage on a line 119 and thereby cause the third set of output signals to appear on the lines 115, 116 and 117. The signals on the lines 115, 116 and 117 are further passed through pairs of CMOS inverters 123, 124, and 125 to provide buffering of the signals before they are supplied to the motor driver 89.

Figure 6:
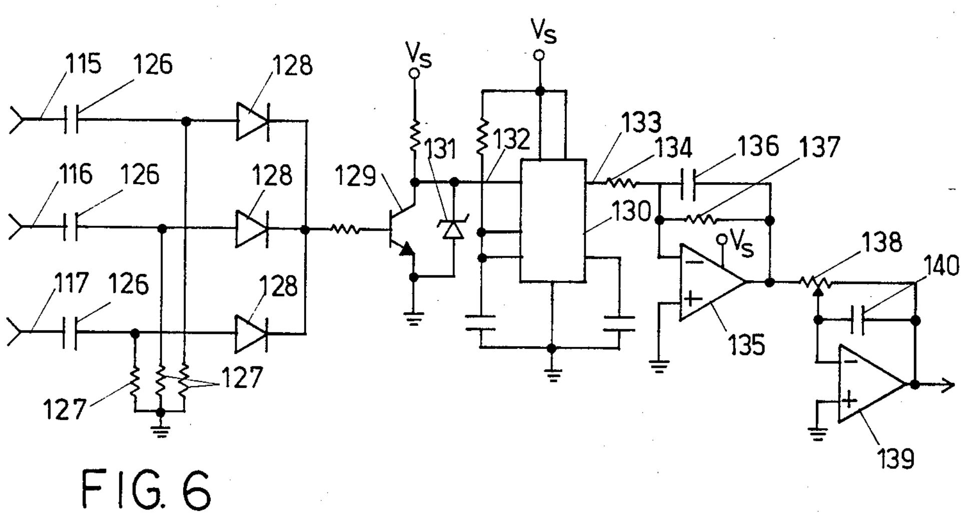
FIG. 6 is an electrical schematic diagram of the analog tachometer circuit.

The analog tachometer circuit, shown in FIG. 6, receives the signals from the output lines 115, 116, and 117, passes these signals through high pass filters composed of capacitors 126 and resistors 127, and rectifies the filtered signals with diodes 128. Each positive going spike passed through the diodes 128 corresponds to the positive going edge of a pulse on the lines 115, 116, or 117. A transistor inverter 129 has its base connected to the cathodes of the diodes 128 and provides a negative spike to a timer 130 configured as a monostable multivibrator for each positive spike passed through the diodes. A zener diode 131 is connected across the transistor 129 to provide a stable reference voltage on the input line 132 to the timer 130. A pulse of fixed duration is thus presented on the output line 133 of the timer 130 for each positive-going edge of the pulses appearing on the lines 115, 116 and 117. The output signal on the line 133 is then provided to a unity gain inverting integrator comprised of an input resistor 134, an operational amplifier 135, a feedback capacitor 136 and a feedback resistor 137. The output of the operational amplifier 135 is a voltage that increases negatively as the frequency of the incoming pulses increase. The output of the integrator is provided through a variable resistor 138 to the inverting input of an operational amplifier 139, with the gain to the output of the amplifier being adjusted by adjustment of potentiometer 138. A feedback capacitor 140 is provided for ripple suppression.

Figure 7:
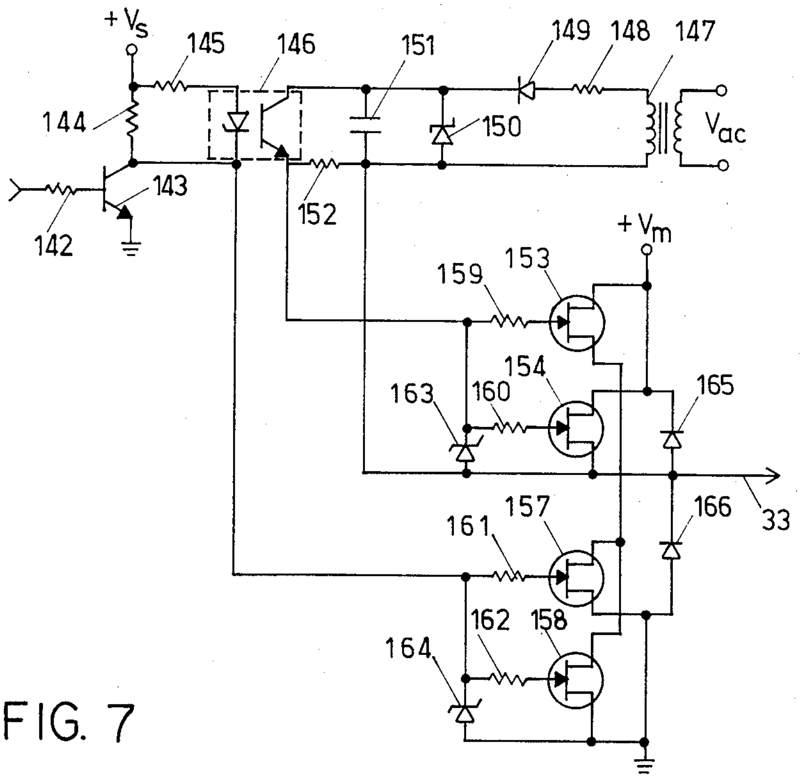
FIG. 7 is an electrical schematic diagram of the motor driver circuit for each of the three phase windings.

A circuit diagram for one of the three identical motor driver circuits connected to one of the three power windings 84 is shown in FIG. 7. The output from a channel (i.e., one of the lines 115, 116 or 117) of the signal detection and phase select circuit is supplied through a base resistor 142 to a transistor 143, acting as an inverter, which has a resistor 144 directly connected between the collector of the transistor and the supply voltage $V_s$ and a series resistor 145 and an optical coupler 146 connected in parallel with the resistor 144. The optical coupler 146 is connected to a floating power supply provided by line voltage $V_{ac}$ transmitted through a transformer 147 and a rectifying and smoothing circuit consisting of a resistor 148, rectifying diode 149, regulating zener diode 150 and a filter formed of a smoothing capacitor 151 and resistor 152. A first pair of power field effect transistors (FETs) 153 and 154 are connected between the motor supply voltage $V_m$ and the output line 33 leading to one of the stator windings, and a second pair of power FETs 157 and 158 are connected between the output line 33 and ground. The FETs are connected in parallel pairs to increase current capability and gate resistors 159, 160, 161, and 162 are utilized to prevent parasitic oscillations between the paralleled FETs. Zener diodes 163 and 164 are connected from the gate to the source of each pair of FETs to prevent voltage spikes from damaging the FETs.

When the incoming signal on the base of the transistor 143 is at a low or zero level, the transistor is turned off, the optical coupler 146 is off, the gates of the upper FETs 153 and 154 are at their source voltage and are off, and the gates of the lower FETs 157 and 158 are pulled to the supply voltage $V_s$ and are on, connecting the line 33 and the stator winding to ground potential. When the incoming signal on the base of the transistor 143 is high, the transistor is on, pulling the gates of the lower FET pair 157 and 158 to ground to switch them off. The optical coupler 146 is switched on, placing a positive potential on the gates of the upper pair of FETs 153 and 154, thereby turning these FETs on and connecting the output line 33 to the motor supply voltage $V_m$. In this manner, the power signal on the output line 33 will follow the input signal pulses supplied to the transistor 143. Diodes 165 and 166 are connected across the source and drains of the respective pairs of FETs to protect the FETs against back voltages from the stator winding.

Figure 8:
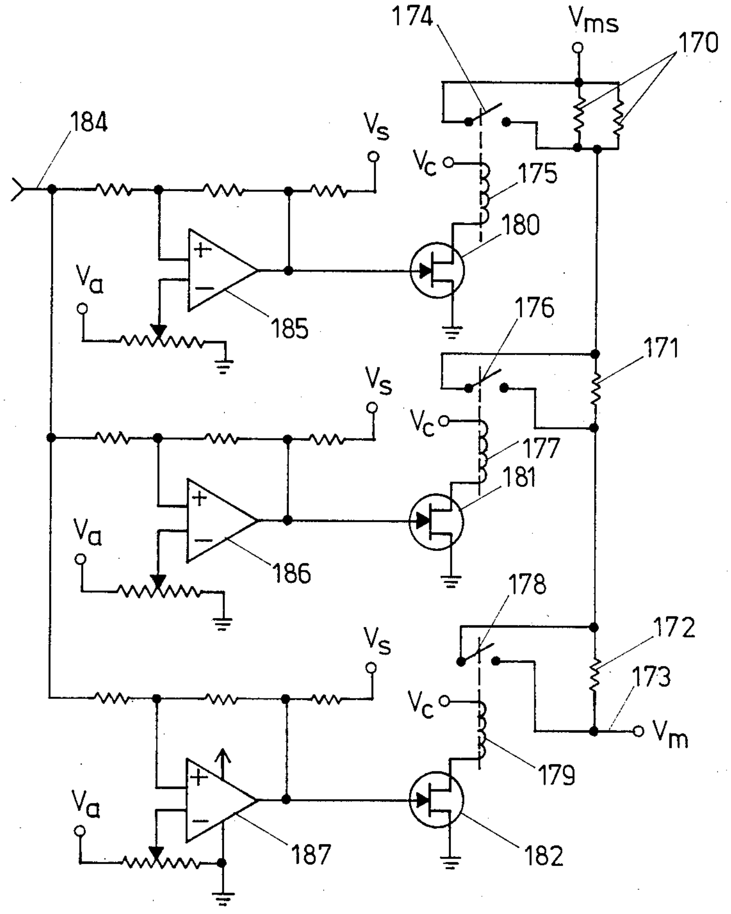
FIG. 8 is an electrical schematic diagram of the motor start-up control circuit.

With this arrangement for driving the polyphase stator machine as a motor, the supply voltage $V_m$ is selected to maintain a desired operating speed for the flywheel. However, if the desired operating voltage is applied to the power FETs at low speeds, more current would be drawn from the supply than the FETs could handle. To limit the start-up current, a start-up circuit 88, shown in FIG. 8, is used to limit the available start-up and low speed power. The start-up circuit includes three sets of power resistors 170, 171, and 172 in series between the constant maximum supply voltage $V_{ms}$ and a power line 173 which supplies the motor drive circuit with the motor voltage $V_m$. The three sets of resistors are successively shorted out by a first relay switch 174 controlled by a coil 175, a second relay switch 176 controlled by a relay coil 177, and a third switch 178 controlled by a coil 179. A power FET 180 is connected in series with the coil 175, an FET 181 with the coil 177 and an FET 182 with the coil 179. The voltage from the output of the analog tachometer is provided on a line 184 to a first comparator 185 which has its output connected to the gate of the FET 180, a second comparator 186 connected to the gate of the FET 181 and a third comparator 187 connected to the gate of the FET 182.

Each of the three comparators is adjusted to switch at a progressively higher voltage on the line 184, successively shorting out the resistors 170, 171, and 172 as the speed of the machine increases, with all the resistors being shorted out when the machine is at a running speed such that the back EMF from the stator windings is sufficient to limit the average current drawn to levels that the FETs in the motor driver circuit can safely handle.

Figure 9:
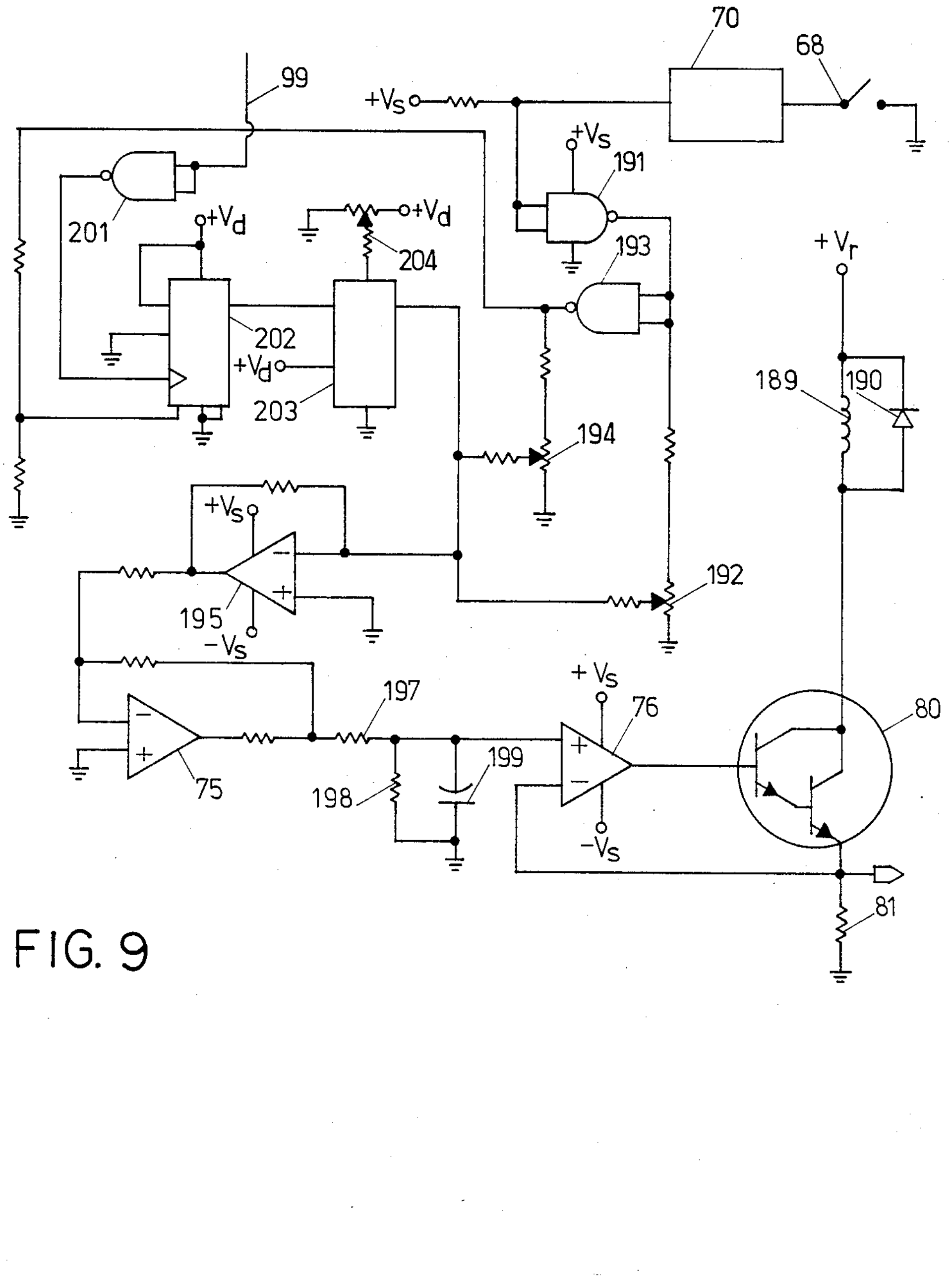
FIG. 9 is an electrical schematic diagram of the control power circuit.

A detailed electrical schematic of the control winding current circuit which provides the control power to the winding 77 is shown in FIG. 9. During operation of the machine 24 as a motor, the circuit provides a first, lower level of current to the field winding 77 to provide adequate stator to rotor coupling without creation of excessive back EMF. Closure of the switch 68 causes the control power circuit to increase the current flowing through the field winding 77 to the higher level required for generator operation. In the circuit shown in FIG. 9, the control current is provided directly to an exciter coil 189 in the coupler 79 which is magnetically coupled to the rotor to supply current to the rotating rotor winding 77. Of course, slip rings can also be used to transmit the control current directly to the rotor winding 77. The current regulating transistor 80 preferably has a Darlington configuration as shown in FIG. 9. A clamping diode 190 is preferably connected across the exciter coil 189 to limit the voltage transients across the coil during switching.

With the switch 68 open, the input to an inverting gate 191 is high—at the supply voltage $V_s$—and there is no voltage across a potentiometer 192 used to set the kVp level. The low output from the gate 191 is inverted by a gate 193 to provide a high voltage level to a potentiometer 194 which sets the desired motor current level. The voltage from the wiper of the potentiometer 194 and from the wiper of the potentiometer 192 is provided to the input of a summing amplifier 195, the output of which is provided to the inverting buffer amplifier 75. The output of the amplifier 75 is preferably provided to a voltage divider composed of a resistor 197 and a resistor 198 (paralleled with a smoothing capacitor 199) to limit the maximum voltage signal provided to the feedback amplifier 76. During the motor mode of operation of the electrical machine 24, only the voltage from the potentiometer 194 appears at the input of the summing amplifier 195, which thus controls the transistor 80 to provide the desired first low level of current for the exciter winding 189.

Upon closure of the switch 68, the input of the inverting gate 191 goes low so that its output voltage across the potentiometer 192 is high, while the output of the gate 193 goes low so that no voltage appears on the wiper of the potentiometer 194. The higher kVp voltage from the potentiometer 192 is fed through the summing amplifier 195, the buffer amplifier 75 and the feedback amplifier 76 to the transistor 80 to provide the higher desired level of current through the exciter coil 189 for generator operation.

It is observed that the output voltage from the stator windings sags with an exponential decay after imposition of the load. If this sag is not compensated for, the X-ray tube voltage will decrease to unacceptable levels during the exposure. In accordance with the present invention, it has been determined that as long as the machine 24 in the generator mode is not operating in its saturated region, the sag in output voltage can be compensated by providing a step boost in field current concurrently with or a short period of time before connection of the power terminals to the load. Since the time constant for the build-up of output voltage at the power terminals upon application of a boost in field current is approximately the same as the time constant for decay of output power upon loading the generator, the output voltage can be maintained substantially constant.

The imposition of the boost shortly before the load is connected is accomplished in the circuit of FIG. 9 by supplying the switching signal from the switch 69 and the tube rotor control 70 on the line 99 to an inverter gate 201 which provides its output to a J-K flip-flop 202. The output of the flip-flop 202, high when the signal is present on the line 99, is provided to a solid state relay 203 which thereupon connects the voltage from the wiper of a potentiometer 204 to the input of the summing amplifier 195, increasing the voltage output from the control amplifier 76 and thereby increasing the current passed by the transistor 80 through the exciter coil 77. Adjustment of the potentiometer 204 allows the magnitude of the current boost to be selected to best cancel the sag in output voltage. Upon release of the switch 68, the output of the gate 193 goes high, causing the flip-flop 202 to revert to its low state and causing the relay 203 to open up so that only voltage from the potentiometer 194 is supplied to the summing amplifier 195.

Figure 10:
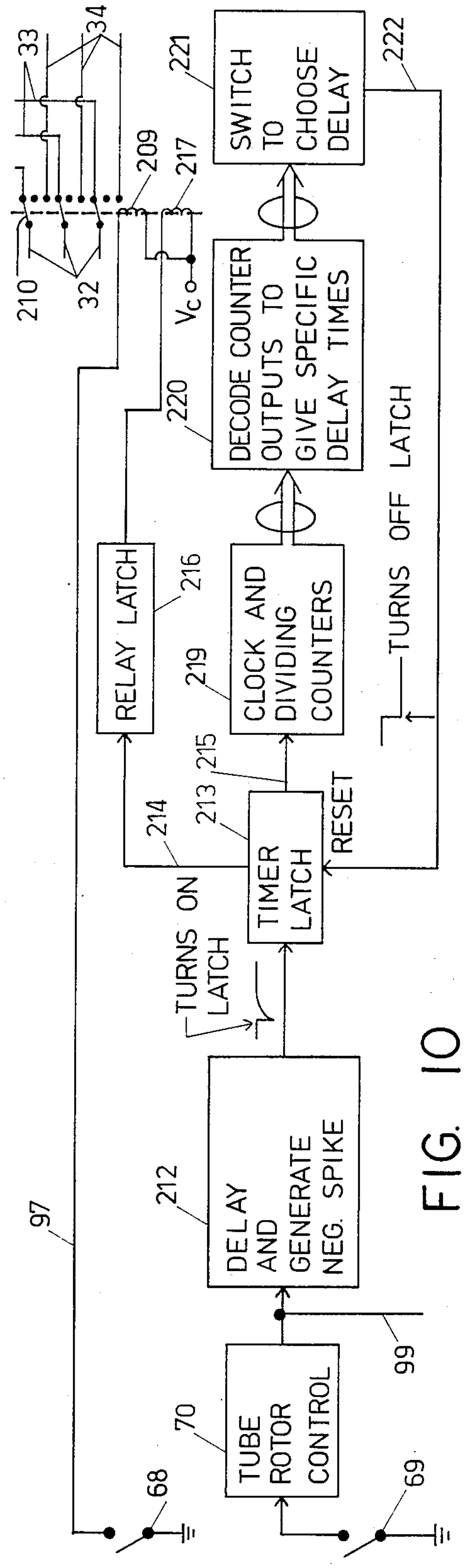
FIG. 10 is a block diagram showing the operation of the exposure timer circuit.

The operation of the exposure timer is shown in FIG. 10. With the switch 68 closed current flows on the line 97 causing a relay coil 209 to move a group of three switches 210 within the motor-generator mode select circuit 49 from a position in which the power terminal lines 32 are connected to the motor drive lines 33 to a position in which the power terminal lines 32 are open circuited. The subsequent closure of the switch 69 activates a delay circuit 212 which generates a negative voltage spike after a selected delay period, such as 100 milliseconds, to allow boost current buildup, and the negative voltage spike turns on a timer latch 213, placing a high output signal on output lines 214 and 215. The output signal on the line 214 activates a relay latch 216 to provide power through a coil 217 which drives the switches 210 to a position in which the power terminal lines 32 are connected to the transformer input lines 34. The signal on the line 215 activates a clock 219 which provides a sequence of regularly timed pulses to a decoder and counter 220. The counter 220 provides output signals after a selected number of pulses from the clock 219 have been counted. A switch 221 is used by the operator to choose the specific delay time desired. After the delay time has passed, an output signal is provided on a line 222 to reset the timer latch 213, driving the output signal on the lines 214 and 215 low, denergizing the coil 217 and allowing the switches 210 to switch back to the neutral position in which the power terminals 32 are open circuited, thereby terminating the X-ray exposure. The coil 209 remains energized until the operator releases the switch 68, which thereby allows the switches 210 to revert back to their initial position in which the power terminals 32 are connected to the motor power supply lines 33.

Figure 11:
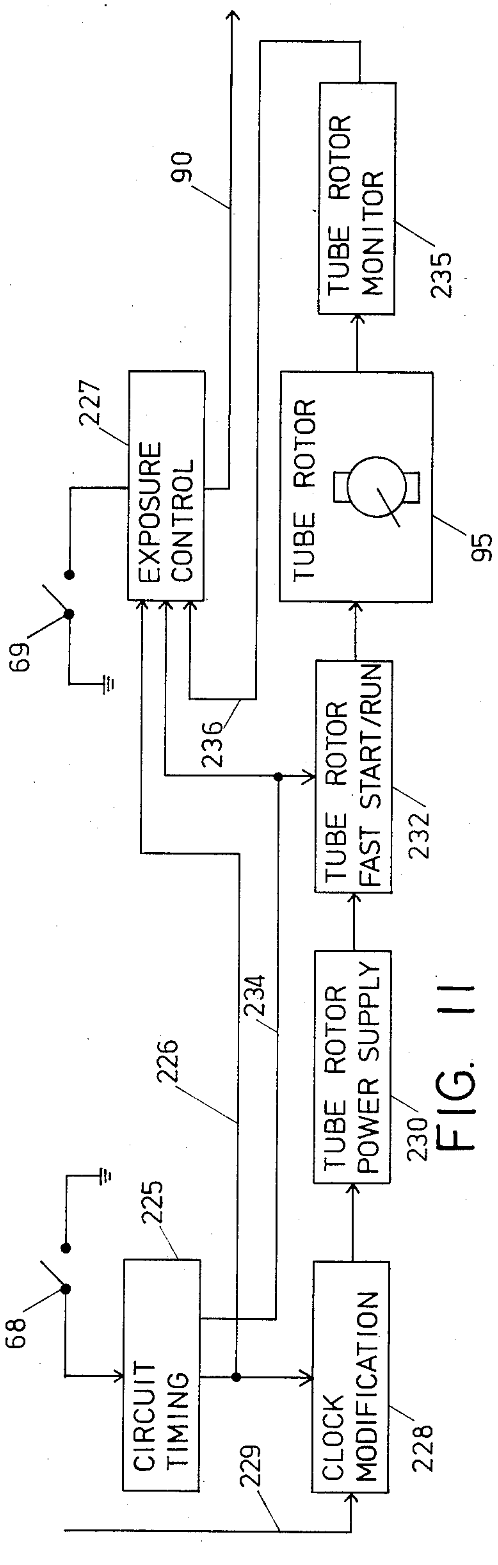
FIG. 11 is a block diagram of the tube rotor controller.

The preferred operation of the tube rotor controller 70 is shown in FIG. 11. Upon closure of the first switch 68, a timing circuit 225 is activated to supply an output signal on a line 226 which closes a first relay within an exposure control relay circuit 227. The signal from the timing circuit also turns on a clock modification circuit 228 which receives a high frequency clock signal on a line 229 (e.g. 200 Hz) and provides a lower frequency pulse signal (e.g. 50 Hz) to a tube rotor power supply 230 which generates pulses of power at the frequency provided by the clock modification circuit 228. Pulses from the power supply 230 are provided to the windings of a tube rotor motor 95 and, during the initial start-up of the rotor, additional power is provided from a tube rotor fast start circuit 232 to drive the rotor up to speed as fast as possible. A preselected period of time after start of the tube rotor motor, the timing circuit 225 puts out a signal on a line 234 to shut off the additional power which had been provided from the circuit 232 during startup and to close a second switch within the exposure control relay 227. A tube rotor monitor circuit 235 monitors the rotor speed and will put out a signal on a line 236 to the exposure control relay 227 when the tube rotor has come up to operating speed. The signal on the line 236 closes a third relay switch within the exposure control relay circuit 227 to provide continuity between the switch 69 and the output line 90 so that the line 90 will be connected to ground when the switch 69 is closed, thereby allowing activation of an X-ray exposure, but only after the tube rotor has come up to full operating speed.

Figure 12:
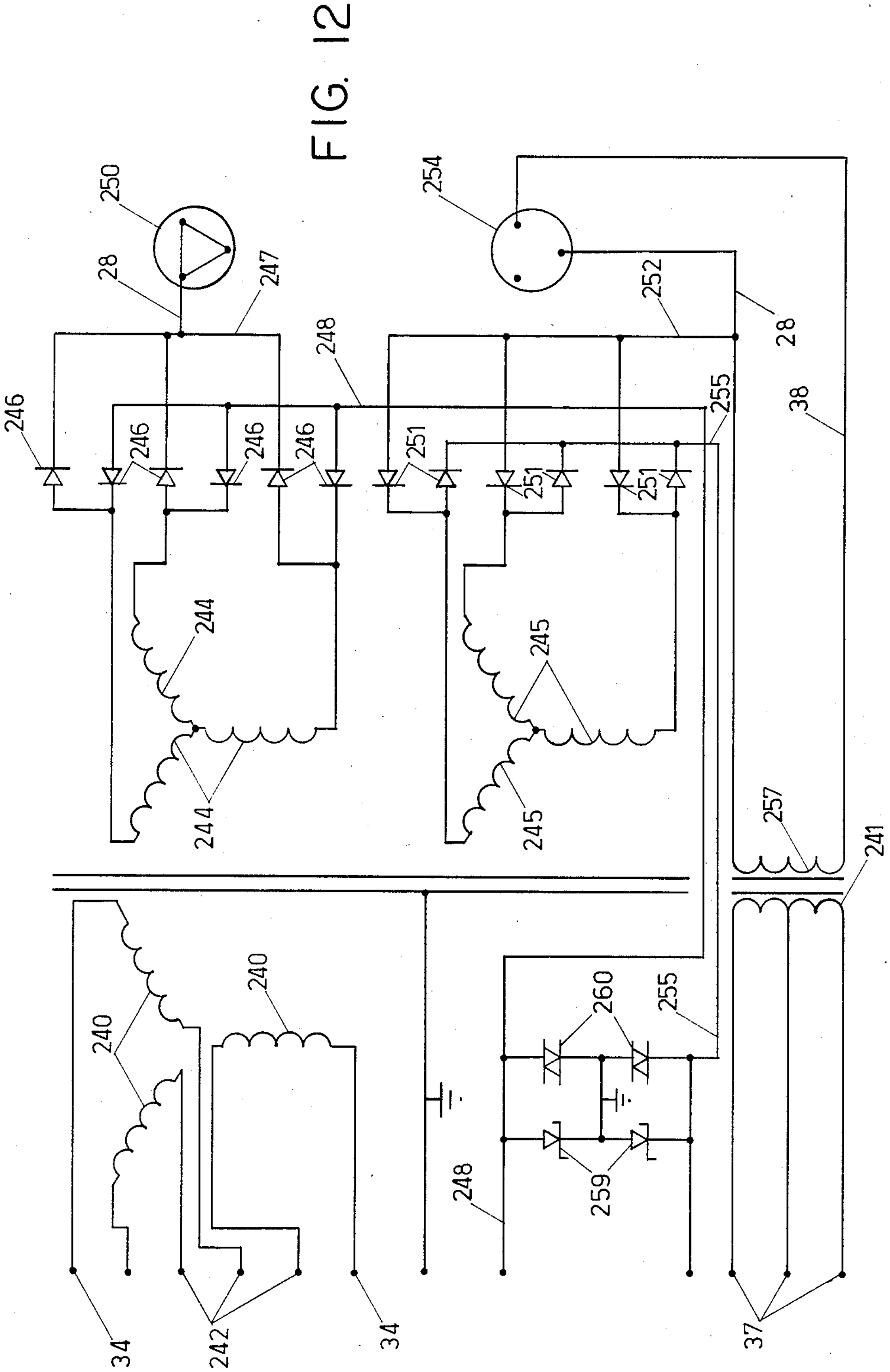
FIG. 12 is a schematic diagram showing the electrical connections of the high tension transformer.

A circuit schematic for the transformer-rectifier 27 is shown in FIG. 12, in which the primary coils 240 of the high tension transformer are connected to the output lines 34 and the primary coil 241 of the filament circuit transformer is connected to the filament power supply lines 37. The center terminals 242 of the high tension transformer primary will generally be connected together to provide a Y configuration for the primary. The secondary of the high tension transformer consists of two sets of Y connected secondary coils 244 and 245. The outputs of the secondary coils 244 are supplied to rectifier assemblies composed of back to back high voltage diodes 246, with the positive rectified voltage supplied through the diodes to a line 247 and the negative rectified voltage supplied through the diodes to a line 248. The line 247 is connected to one of the cables 28 leading to the anode 250 of the X-ray tube. The second set of secondary coils 245 have their outputs connected through a rectifier assembly composed of diodes 251, with negative voltages being supplied through the diodes to a line 252 connected to the cable 28 leading to the cathode 254, while the positive going voltages are passed by the diodes to a line 255.

Series combinations of diodes generally will be used for each of the diodes 246 and 251 shown in FIG. 12 to obtain sufficient voltage carrying capability. Using this configuration, the open circuit input voltage of 115 VAC, line to neutral, can be raised to a rectified peak of about 68 kVp for each half of the transformer or about 125 kVp between the cathode and anode. The filament supply voltage from the secondary winding 257 of the filament transformer is applied between one of the cables 28 leading to the cathode and the filament power line 38. The reference or neutral lines 248 and 255 are connected to ground through zener diodes 259 and diacs 260 such that they may normally float slightly above or below ground potential but will be allowed to conduct to ground if overly large potentials appear on the lines.

At the high frequencies preferably used in the present invention (e.g., 320 Hz rather than 60 Hz), the transformer can be made relatively small and the ripple frequency for the Y-Y secondary, Y primary configuration will be high (1,920 Hz for 320 Hz, 3 phase input). The tube cables have a sufficient electrical capacity to provide adequate smoothing of the ripple voltage.

For maximum protection against breakdown, the entire transformer and rectifier assembly is preferably immersed in dielectric oil in an evacuated housing.

It is understood that the invention is not confined to the particular embodiment herein illustrated and described, but embraces such modified forms thereof as come within the scope of the following claims.

What is claimed is:

1. A power supply for providing pulsed power to X-ray generating equipment comprising:

(a) a flywheel mounted for rotation;

(b) an electrical rotating machine having a rotor coupled by a shaft to the flywheel, a stator power winding, a rotor control winding, power terminals electrically coupled to the power winding and control terminals electrically coupled to the control winding;

(c) control power means connected to the control terminals of the electrical machine for supplying a selected control current to the control winding during operation of the electrical machine as a motor and for supplying a selected control current to the control winding when the machine is operated as a generator;

(d) motor drive means selectively connectable to the power terminals of the electrical machine for providing a varying electrical voltage to the power terminals at a frequency and phase selected to drive the rotor of the machine and the flywheel connected therewith; and (e) motor-generator mode select switch means, connected to the power terminals of the electrical machine and to the output power of the motor drive means and having output lines, for responding to control signals to selectively connect the power terminals of the electrical machine to the motor drive means during a motor mode and for responding to a control signal to selectively disconnect the power terminals of the electrical machine from the motor drive means and to connect the power terminals to the output lines during a generator mode.

2. The X-ray power supply of claim 1 including exposure timer means, responsive to a signal from an operator to initiate exposure, for providing a control signal to the mode select switch means to switch connection of the power terminals of the electrical machine from the motor drive means to the output lines and for providing a signal to the mode select switch means a selected period of time later corresponding to the termination of the X-ray exposure to disconnect the electrical machine power terminals from the output lines.

3. The X-ray power supply of claim 1 wherein the electrical machine has polyphase stator windings and wherein the motor drive means includes:

(a) means for sensing the position of the rotor shaft and providing a signal indicative thereof; and (b) means for receiving the signal indicative of rotor shaft position and providing output signals equal in number to the number of stator phase windings, each of the output signals being in the form of pulses of voltage extending over a selected portion of the revolution of the rotor, the output signal pulses for each of the phase windings being spaced in phase at regular intervals to cover the entire revolution of the rotor and supplied to the stator phase windings such that the voltages across the phase windings cooperate to provide a magnetic field from the stator rotating in synchrony with the rotor.

4. The X-ray power supply of claim 3 wherein the means for sensing rotor shaft position comprises light reflective sectors on the flywheel and a plurality of optical sensors cooperating with the light reflective sectors on the flywheel to provide electrical pulses from each of the sensors as the light reflective sectors on the flywheel rotate past the sensors.

5. The X-ray power supply of claim 3 including means for sensing rotor shaft speed and providing an output signal indicative thereof, and wherein the motor drive means is responsive to the signal indicative of rotor shaft speed to advance the phase of the pulses of voltage applied to the stator windings with respect to rotor shaft position as the rotor speed increases.

6. The X-ray power supply of claim 3 wherein the motor drive means includes means for increasing the power available for supply to the stator windings in the pulses of voltage applied to the windings as the rotor speed increases.

7. The X-ray power supply of claim 1 wherein the control power means is responsive to a signal provided by an operator to increase the current in the control winding to a level selected to provide a desired open circuit output voltage on the power terminals of the electrical machine after a characteristic rise time, whereafter the power terminals of the machine may be connected to a load, and wherein the control power means provides a step increase in current through the control winding a selected period of time before a load is connected to the power terminals to provide a compensatory increase in output voltage to substantially cancel the effect of the sag in output voltage at the power terminals upon connection of the load.

8. The X-ray power supply of claim 7 wherein the control power means is adjustable by an operator to provide a current through the control winding selectable by the operator such that the voltage output at the power terminals of the electrical machine is sufficient to produce a desired kVp level in an X-ray machine.

9. A power supply for providing pulsed power to X-ray generating equipment comprising:

(a) a flywheel mounted for rotation;

(b) an electrical rotating machine having a rotor coupled by a shaft to the flywheel, a stator power winding, a rotor control winding, power terminals electrically coupled to the power winding and control terminals electrically coupled to the control winding; and (c) control power means, responsive to a signal from the operator requesting an exposure, for providing a control current through the control winding of the electrical machine such that the output voltage at the power terminals of the machine reaches a desired output level after a characteristic rise time, and for applying an increase in current through the control winding a selected period of time before the X-ray load is connected to the power terminals to provide a rise in output voltage at the power terminals that will substantially compensate for the sag in output voltage occuring upon connection of the X-ray load.

10. The X-ray power supply of claim 9 wherein the control power means supplies a selected control current to the control winding during operation of the electrical machine as a motor and including: motor drive means selectively connectable to the power terminals of the electrical machine for providing a varying electrical voltage to the power terminals at a frequency and phase selected to drive the rotor of the machine and the flywheel connected therewith.

11. The X-ray power supply of claim 10 including motor-generator mode select switch means, connected to the power terminals of the electrical machine and to the output power of the motor drive means and having output lines, for responding to control signals to selectively connect the power terminals of the electrical machine to the motor drive means during a motor mode and for responding to a control signal to selectively disconnect the power terminals of the electrical machine from the motor drive means and to connect the power terminals to the output lines during a generator mode.

12. The X-ray power supply of claim 10 including exposure timer means, responsive to a signal from an operator to initiate exposure, for providing a control signal to the mode select switch means to switch connection of the power terminals of the electrical machine from the motor drive means to the output lines and for providing a signal to the mode select switch means a selected period of time later corresponding to the termination of the X-ray exposure to disconnect the electrical machine power terminals from the output lines.

13. The X-ray power supply of claim 10 wherein the electrical machine has polyphase stator windings and wherein the motor drive means includes:

(a) means for sensing the position of the rotor shaft and providing a signal indicative thereof; and (b) means, receiving the signal indicative of rotor shaft position, for providing output signals equal in number to the number of stator phase windings, each of the output signals being in the form of pulses of voltage extending over a selected portion of the revolution of the rotor, the output signal pulses for each of the phase windings being spaced in phase at regular intervals to cover the entire revolution of the rotor and supplied to the stator phase windings such that the voltages across the phase windings cooperate to provide a magnetic field from the stator rotating in synchrony with the rotor.

14. The X-ray power supply of claim 13 wherein the means for sensing rotor shaft position comprises light reflective sectors on the flywheel and a plurality of optical sensors cooperating with the light reflective sectors on the flywheel to provide electrical pulses from each of the sensors as the light reflective sectors on the flywheel rotate past the sensors.

15. The X-ray power supply of claim 13 including means for sensing rotor shaft speed and providing an output signal indicative thereof, and wherein the motor drive means is responsive to the signal indicative of rotor shaft speed to advance the phase of the pulses of voltage applied to the stator windings with respect to rotor shaft position as the rotor speed increases.

16. The X-ray power supply of claim 13 wherein the motor drive means includes means for increasing the power available for supply to the stator windings in the pulses of voltage applied to the windings as the rotor speed increases.

17. The X-ray power supply of claim 9 wherein the control power means is adjustable by an operator to provide a current through the control winding selectable by the operator such that the voltage output at the power terminals of the electrical machine is sufficient to produce a desired kVp level in an X-ray machine.

18. Mobile X-ray generating apparatus comprising:

(a) a flywheel mounted for rotation;

(b) an electrical rotating machine having a rotor coupled by a shaft to the flywheel, a stator power winding, a rotor control winding, power terminals electrically coupled to the power winding and control terminals electrically coupled to the control winding;

(c) an X-ray tube having an anode and a cathode;

(d) a transformer having a primary selectively receiving power from the power terminals of the electrical machine and increasing the voltage of the power received to a high voltage level at the secondary thereof;

(e) rectifier means for rectifying the AC voltage from the secondary of the transformer to a direct voltage, and connected to provide the rectified high voltage across the anode and cathode of the X-ray tube;

(f) control power means connected to the control terminals of the electrical machine for supplying a selected control current to the control winding during operation of the electrical machine as a motor and for supplying another selected control current to the control winding when the machine is operated as a generator;

(g) motor drive means selectively connectable to the power terminals of the electrical machine for providing a varying electrical voltage to the power terminals at a frequency and phase selected to drive the rotor of the machine and the flywheel connected therewith; and (h) motor-generator mode select switch means, connected to the power terminals of the electrical machine and to the output power of the motor drive means and having output lines connected to the primary of the transformer, for responding to control signals to selectively connect the power terminals of the electrical machine to the motor drive means and for responding to a control signal to selectively disconnect the power terminals of the electrical machine from the motor drive means and to connect the power terminals to the output lines to apply power to the transformer.

19. The apparatus of claim 18 including exposure timer means, responsive to a signal from an operator to initiate exposure, for providing a control signal to the mode select switch means to switch connection of the power terminals of the electrical machine from the motor drive means to the output lines such that output power is transmitted from the electrical machine to the transformer to apply a high voltage across the X-ray tube, and for providing a signal to the mode select switch means a selected period of time later corresponding to the termination of the X-ray exposure to disconnect the electrical machine power terminals from the output lines.

20. The apparatus of claim 18 wherein the electrical machine has polyphase stator windings and wherein the motor drive means includes:

(a) means for sensing the position of the rotor shaft and providing a signal indicative thereof; and (b) means for receiving the signal indicative of rotor shaft position and providing output signals equal in number to the number of stator phase windings, each of the output signals being in the form of pulses of voltage extending over a selected portion of the revolution of the rotor, the output signal pulses for each of the phase windings being spaced in phase at regular intervals to cover the entire revolution of the rotor and supplied to the stator phase windings such that the voltages across the phase windings combine to provide a magnetic field from the stator rotating in synchrony with the rotor.

21. The apparatus of claim 20 wherein the means for sensing rotor shaft position comprises light reflective sectors on the flywheel and a plurality of optical sensors cooperating with the light reflective sectors on the flywheel to provide electrical pulses from each of the sensors as the light reflective sectors on the flywheel rotate past the sensors.

22. The apparatus of claim 20 including means for sensing rotor shaft speed and providing an output signal indicative thereof, and wherein the motor drive means is responsive to the signal indicative of rotor shaft speed to advance the phase of the pulses of voltage applied to the stator windings with respect to rotor shaft position as the rotor speed increases.

23. The apparatus of claim 20 wherein the motor drive means includes means for increasing the power available for supply to the stator windings in the pulses of voltage applied to the windings as the rotor speed increases.

24. The apparatus of claim 18 wherein the control power means is responsive to a signal provided by an operator to increase the current in the control winding to a level selected to provide a desired open circuit output voltage on the power terminals of the electrical machine after a characteristic rise time, whereafter the power terminals of the machine may be connected to the transformer, and wherein the control power means provides a step increase in current through the control winding a selected period of time before the transformer is connected to the power terminals to provide a compensatory increase in output voltage to substantially cancel the effect of the sag in output voltage at the power terminals upon connection of the transformer.

25. The apparatus of claim 24 wherein the control power means is adjustable by an operator to provide a current through the control windings selectable by the operator such that the voltage output at the power terminals of the X-ray machine provides a desired peak voltage level from the rectifier means across the X-ray tube.

26. The apparatus of claim 18 wherein the stator has three phase windings and produces a three phase output at the power terminals, wherein the transformer has a three phase primary winding and wherein the secondary has two sets of three phase windings, the outputs of which are passed through diodes of the rectifier means connected such that one set of secondary windings produces a positive rectified voltage which is applied to the X-ray tube anode and the other set of secondary windings produces a negative rectified voltage which is applied to the X-ray tube cathode.

27. Mobile X-ray generating apparatus comprising:

(a) a flywheel mounted for rotation;

(b) an electrical rotating machine having a rotor coupled by a shaft to the flywheel, a stator power winding, a rotor control winding, power terminals electrically coupled to the power winding and control terminals electrically coupled to the control winding;

(c) an X-ray tube having an anode and a cathode;

(d) a transformer having a primary selectively receiving power from the power terminals of the electrical machine and increasing the voltage of the power received to a high voltage level at the secondary thereof;

(e) rectifier means for rectifying the AC voltage from the secondary of the transformer to a direct voltage, and connected to provide the rectified high voltage across the anode and cathode of the X-ray tube; and (f) control power means, responsive to a signal from the operator requesting an exposure, for providing a control current through the control winding of the electrical machine such that the output voltage at the power terminals of the machine reaches a desired output level after a characteristic rise time, and for applying an increase in current through the control winding a selected period of time before the primary of the transformer is connected to the power terminals to provide a voltage across the X-ray tube to tend to increase the output voltage at the power terminals to substantially compensate for the sag in output voltage occurring upon connection of the transformer to the power terminals.

28. The apparatus of claim 27 wherein the control power means supplies a selected control current to the control winding during operation of the electrical machine as a motor and including:

motor drive means selectively connectable to the power terminals of the electrical machine for providing a varying electrical voltage to the power terminals at a frequency and phase selected to drive the rotor of the machine and the flywheel connected therewith.

29. The apparatus of claim 28 including motor-generator mode select switch means, connected to the power terminals of the electrical machine and to the output power of the motor drive means and having output lines connected to the primary of the transformer, for responding to control signals to selectively connect the power terminals of the electrical machine to the motor drive means during a motor mode and for responding to a control signal to selectively disconnect the power terminals of the electrical machine from the motor drive means and to connect the power terminals to the output lines connected to the primary of the transformer during a generator mode.

30. The apparatus of claim 28 including exposure timer means, responsive to a signal from an operator to initiate exposure, for providing a control signal to the mode select switch means to switch connection of the power terminals of the electrical machine from the motor drive means to the output lines connected to the primary of the transformer to cause an X-ray exposure to be made.

31. The apparatus of claim 28 wherein the electrical machine has polyphase stator windings and wherein the motor drive means includes:

(a) means for sensing the position of the rotor shaft and providing a signal indicative thereof; and (b) means, receiving the signal indicative of rotor shaft position, for providing output signals equal in number to the number of stator phase windings, each of the output signals being in the form of pulses of voltage extending over a selected portion of the revolution of the rotor, the output signal pulses for each of the phase windings being spaced in phase at regular intervals to cover the entire revolution of the rotor and supplied to the stator phase winding such that the voltages across the phase windings cooperate to provide a magnetic field from the stator rotating in synchrony with the rotor.

32. The apparatus of claim 31 wherein the means for sensing rotor shaft position comprises light reflective sectors on the flywheel and a plurality of optical sensors cooperating with the light reflective sectors on the flywheel to provide electrical pulses from each of the sensors as the light reflective sectors on the flywheel rotate past the sensors.

33. The apparatus of claim 31 including means for sensing rotor shaft speed and providng an output signal indicative thereof, and wherein the motor drive means is responsive to the signal indicative of rotor shaft speed to advance the phase of the pulses of voltage applied to the stator windings with respect to rotor shaft position as the rotor speed increases.

34. The apparatus of claim 31 wherein the motor drive means includes means for increasing the power available for supply to the stator windings in the pulses of voltage applied to the windings as the rotor speed increases.

35. The apparatus of claim 27 wherein the control power means is adjustable by an operator to provide a current through the control winding selectable by the operator such that the voltage output at the power terminals of the electrical machine is sufficient to produce a desired output voltage from the rectifier means across the anode and cathode of the X-ray tube.

36. The apparatus of claim 27 wherein the stator has three phase windings and produces a three phase output at the power terminals, wherein the transformer has a three phase primary winding and wherein the secondary has two sets of three phase windings, the outputs of which are passed through diodes of the rectifier means connected such that one set of secondary windings produces a positive rectified voltage which is applied to the X-ray tube anode and the other set of secondary windings produces a negative rectified voltage which is applied to the X-ray tube cathode.

37. A method of controlling the voltage supplied by a flywheel driven generator, having stator power windings and a rotor control winding, through a transformer and rectifier to an X-ray tube, comprising the steps of:

(a) providing a current through the control winding sufficient to produce a desired open circuit output voltage from the stator windings;

(b) connecting the primary of the transformer to the terminals of the stator power windings to supply power from the generator to the X-ray tube; and (c) a selected period of time before connecting the transformer to the stator power windings, increasing the current in the control winding to a level selected to cause the potential increase in output voltage dur to the increased current to substantially cancel the potential decrease in output voltage occurring as the stator power windings of the generator are loaded so that the output voltage remains substantially constant during an X-ray exposure.

38. A power supply for providing pulsed power to X-ray generating equipment comprising:

(a) a flywheel mounted for rotation;

(b) an electrical rotating machine having a rotor coupled by a shaft to the flywheel, a stator power winding, a rotor control winding, power terminals electrically coupled to the power winding and control terminals electrically coupled to the control winding;

(c) control power means connected to the control terminals of the electrical machine for supplying a selected control current to the control winding during operation of the electrical machine as a motor and for supplying a selected control current to the control winding when the machine is operated as a generator, wherein the control power means is responsive to a signal provided by an operator to increase the current in the control winding to a level selected to provide a desired open circuit output voltage on the power terminals of the electrical machine after a characteristic rise time, whereafter the power terminals of the machine may be connected to a load, and wherein the control power means provides a step increase in current through the control winding a selected period of time before a load is connected to the power terminals to provide a compensatory increase in output voltage to substantially cancel the effect of the sag in output voltage at the power terminals upon connection of the load; and (d) motor drive means selectively connectable to the power terminals of the electrical machine for providing a varying electrical voltage to the power terminals at a frequency and phase selected to drive the rotor of the machine and the flywheel connected therewith.

39. The X-ray power supply of claim 38 wherein the control power means is adjustable by an operator to provide a current through the control winding selectable by the operator such that the voltage output at the power terminals of the electrical machine is sufficient to produce a desired kVp level in an X-ray machine.

40. Mobile X-ray generating apparatus comprising:

(a) a flywheel mounted for rotation;

(b) an electrical rotating machine having a rotor coupled by a shaft to the flywheel, polyphase stator power windings, a rotor control winding, power terminals electrically coupled to the power windings and control terminals electrically coupled to the control winding;

(c) an X-ray tube having an anode and a cathode;

(d) a transformer having a primary selectively receiving power from the power terminals of the electrical machine and increasing the voltage of the power received to a high voltage level at the secondary thereof;

(e) rectifier means for rectifying the AC voltage from the secondary of the transformer to a direct voltage, and connected to provide the rectified high voltage across the anode and cathode of the X-ray tube;

(f) control power means connected to the control terminals of the electrical machine for supplying a selected control current to the control winding during operation of the electrical machine as a motor and for supplying another selected control current to the control winding when the machine is operated as a generator; and (g) motor drive means selectively connectable to the power terminals of the electrical machine for providing a varying electrical voltage to the power terminals at a frequency and phase selected to drive the rotor of the machine and the flywheel connected therewith, the motor drive means including:

(1) means for sensing the position of the rotor shaft and providing a signal indicative thereof; and (2) means for receiving the signal indicative of rotor shaft position and providing output signals equal in number to the number of stator phase windings, each of the output signals being in the form of pulses of voltage extending over a selected portion of the revolution of the rotor, the output signal pulses for each of the phase windings being spaced in phase at regular intervals to cover the entire revolution of the rotor and supplied to the stator phase windings such that the voltages across the phase windings combine to provide a magnetic field from the stator rotating in synchrony with the rotor.

41. The apparatus of claim 40 wherein the means for sensing rotor shaft position comprises light reflective sectors on the flywheel and a plurality of optical sensors cooperating with the light reflective sectors on the flywheel to provide electrical pulses from each of the sensors as the light reflective sectors on the flywheel rotate past the sensors.

42. The apparatus of claim 40 including means for sensing rotor shaft speed and providing an output signal indicative thereof, and wherein the motor drive means is responsive to the signal indicative of the rotor shaft speed to advance the phase of the pulses of voltage applied to the stator windings with respect to rotor shaft position as the rotor speed increases.

43. The apparatus of claim 40 wherein the motor drive means includes means for increasing the power available for supply to the stator windings in the pulses of voltage applied to the windings as the rotor speed increases.

44. Mobile X-ray generating apparatus comprising:

(a) a flywheel mounted for rotation;

(b) an electrical rotating machine having a rotor coupled by a shaft to the flywheel, a stator power winding, a rotor control winding, power terminals electrically coupled to the power winding and control terminals electrically coupled to the control winding;

(c) an X-ray tube having an anode and a cathode;

(d) a transformer having a primary selectively receiving power from the power terminals of the electrical machine and increasing the voltage of the power received to a high voltage level at the secondary thereof;

(e) rectifier means for rectifying the AC voltage from the secondary of the transformer to a direct voltage, and connected to provide the rectified high voltage across the anode and cathode of the X-ray tube;

(f) control power means connected to the control terminals of the electrical machine for supplying a selected control current to the control winding during operation of the electrical machine as a motor and for supplying another selected control current to the control winding when the machine is operated as a generator, wherein the control power means is responsive to a signal provided by an operator to increase the current in the control winding to a level selected to provide a desired open circuit output voltage on the power terminals of the electrical machine after a characteristic rise time, whereafter the power terminals of the machine may be connected to a transformer, and wherein the control power means provides a step increase in current through the control winding a selected period of time before the transformer is connected to the power terminals to provide a compensatory increase in output voltage to substantially cancel the effect of the sag in output voltage at the power terminals upon connection of the transformer; and (g) motor drive means selectively connectable to the power terminals of the electrical machine for providing a varying electrical voltage to the power terminals at a frequency and phase selected to drive the rotor of the machine and the flywheel connected therewith.

45. The apparatus of claim 44 wherein the control power means is adjustable by an operator to provide a current through the control windings selectable by the operator such that the voltage output at the power terminals of the X-ray machine provides a desired peak voltage level from the rectifier means across the X-ray tube.

46. Mobile X-ray generating apparatus comprising:

(a) a flywheel mounted for rotation;

(b) an electrical rotating machine having a rotor coupled by a shaft to the flywheel, three phase stator power windings producing a three phase output, a rotor control winding, three phase power terminals electrically coupled to the power windings and control terminals electrically coupled to the control winding;

(c) an X-ray tube having an anode and a cathode;

(d) a transformer having a three phase primary winding selectively receiving power from the power terminals of the electrical machine and increasing the voltage of the power received to a high voltage level at the secondary thereof, the secondary having two sets of three phase windings;

(e) rectifier means for rectifying the AC voltage from the secondary of the transformer to a direct voltage, and connected to provide the rectified high voltage across the anode and cathode of the X-ray tube, the rectifier means having diodes connected such that the output of one set of transformer secondary windings is rectified to produce a positive rectified voltage which is applied to the X-ray tube anode and such that the output of the other set of transformer secondary windings is rectified to produce a negative rectified voltage which is applied to the X-ray tube cathode;

(f) control power means connected to the control terminals of the electrical machine for supplying a selected control current to the control winding during operation of the electrical machine as a motor and for supplying another selected control current to the control winding when the machine is operated as a generator; and (g) motor drive means selectively connectable to the power termains of the electrical machine for providing a varying electrical voltage to the power terminals at a frequency and phase selected to drive the rotor of the machine and the flywheel connected therewith.

* * * * *

UNITED STATES PATENT AND TRADEMARK OFFICE

CERTIFICATE OF CORRECTION

PATENT NO. : 4,540,930

DATED : September 10, 1985

INVENTOR(S) : Melvin P. Siedband

It is certified that error appears in the above-identified patent and that said Letters Patent are hereby corrected as shown below:

In the title, "PLYWHEEL-POWERED" should read --FLYWHEEL-POWERED--

In the abstract, line 6, "controller (21)" should read --controller (31)--.

Signed and Sealed this

*Third* Day of *December 1985*

[SEAL]

*Attest:*

DONALD J. QUIGG

*Attesting Officer* *Commissioner of Patents and Trademarks*